United States Patent [19]
Dunstan

[11] Patent Number: 4,503,839
[45] Date of Patent: Mar. 12, 1985

[54] WATER PREHEATER SYSTEM

[76] Inventor: Phillip E. Dunstan, 1022 S. 208th St., Seattle, Wash. 98148

[21] Appl. No.: 501,794

[22] Filed: Jun. 7, 1983

[51] Int. Cl.³ .............................................. F24J 3/02
[52] U.S. Cl. .................................. 126/437; 126/450; 126/435; 126/900
[58] Field of Search .............. 126/435, 436, 437, 419, 126/420, 422, 450, 901, 444, 445, 400

[56] References Cited

U.S. PATENT DOCUMENTS

| | | | |
|---|---|---|---|
| 3,943,911 | 3/1976 | Yu | 126/450 |
| 3,985,117 | 10/1976 | Sallen | 126/447 |
| 4,036,209 | 7/1977 | Press | 126/426 |
| 4,048,981 | 9/1977 | Hobbs | 126/422 |
| 4,055,163 | 10/1977 | Costello et al. | 126/450 |
| 4,098,265 | 7/1978 | Gravely | 126/450 |
| 4,119,086 | 10/1978 | Brussels | 126/400 |
| 4,119,087 | 10/1978 | Cook | 126/422 |
| 4,153,043 | 5/1979 | Goolsby | 126/437 |
| 4,169,460 | 10/1979 | Popovich | 126/437 |
| 4,207,866 | 6/1980 | Boyd | 126/437 |
| 4,299,200 | 10/1981 | Spencer | 126/445 |
| 4,305,382 | 12/1981 | Nott | 126/433 |
| 4,399,807 | 8/1983 | Buckley et al. | 126/418 |

Primary Examiner—James C. Yeung
Attorney, Agent, or Firm—Seed and Berry

[57] ABSTRACT

A heat transfer liquid 38 collects heat in a solar collector 10 and transfers the heat to water in a preheater heat exchanger 12. Use of a negative-pressure collector 10 by means of an ejector 24 and pressure relief valve 32 allows inexpensive and readily available materials to be used in the collector 10. Preferably, the preheat heat exchanger 12 is a converted gas hot water heater in which the heat transfer liquid 38 is sprayed onto a portion of the storage tank 20 and is collected in a reservoir 18. The negative-pressure solar collector 10 can also be used to heat swimming pool water.

33 Claims, 5 Drawing Figures

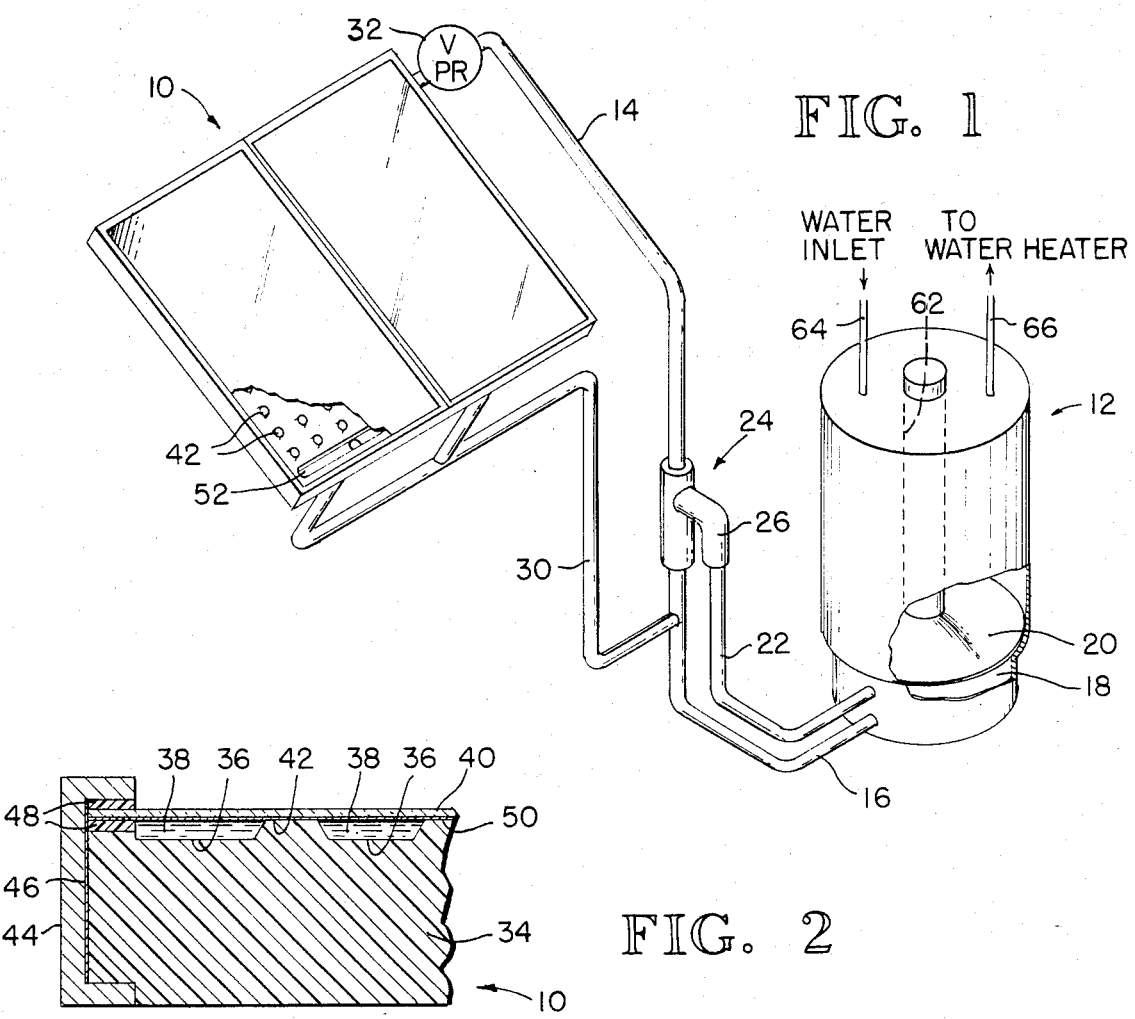
FIG. 1
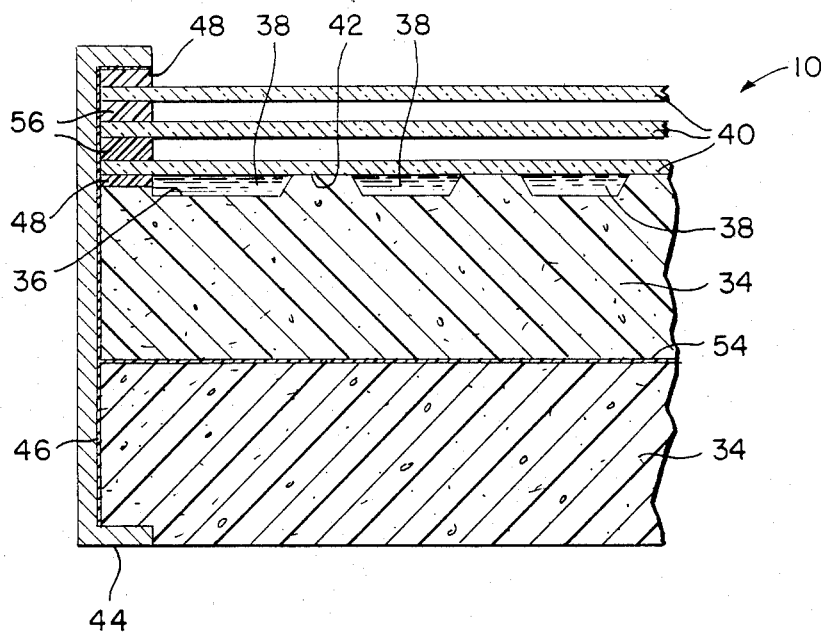
FIG. 2
FIG. 3

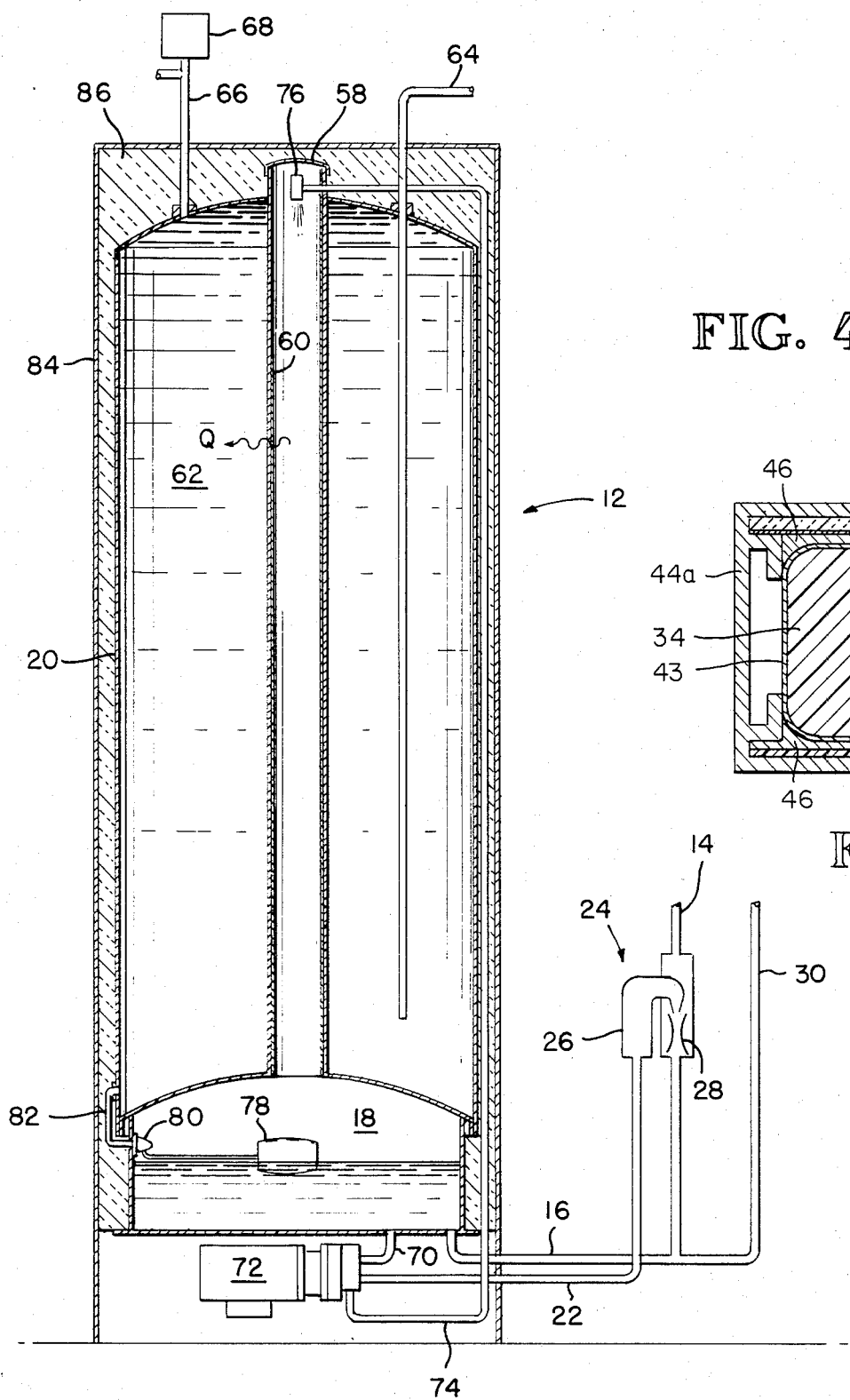
FIG. 4
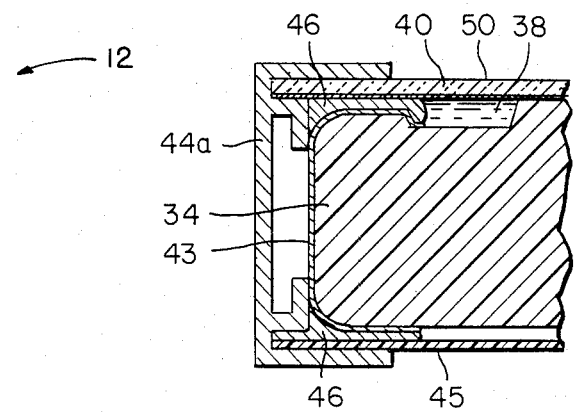
FIG. 5
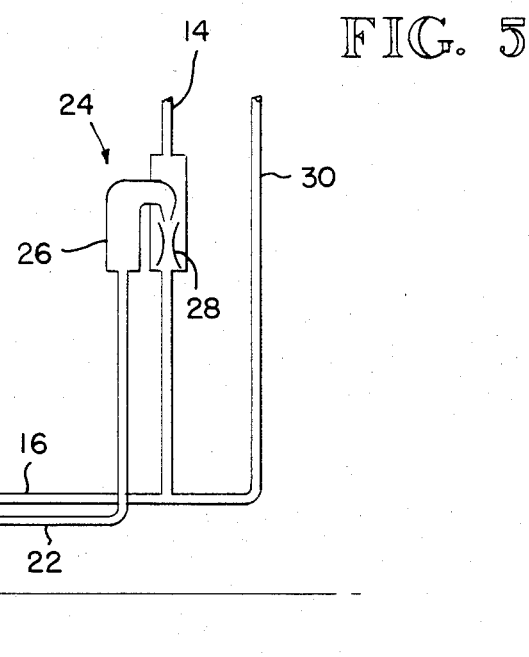

WATER PREHEATER SYSTEM

DESCRIPTION

Technical Field

The present invention relates to a water preheater system especially adapted for use in homes or to heat swimming pools. More particularly, the invention relates to a water-filled solar collector connected to a preheater heat exchanger for preheating water for home use.

Background Art

Generally, flat-plate solar collectors (see, e.g., U.S. Pat. No. 4,219,012) consist of a casing to hold glazing, an absorber plate, and insulation to allow absorption of radiant energy while minimizing heat transfer losses back to the environment. The radiant heat energy absorbed by the absorber plate is transferred to a fluid which circulates through the collector in tubes that are thermally bonded to the absorber plate. In a common solar collector, the "wetted area" is usually quite small since most of the heat is conducted transversely through the thin metal plate to the tubes containing the heat transfer fluid. The small wetted area limits the efficiency of this type of construction to approximately 75%. Also, heat losses occur during the transfer of absorbed heat from the absorber plate to the fluid. During periods when energy is not being extracted from the panels, such as when there is a power outage, the stagnation temperature in the solar collector reaches approximately 400° F. This high stagnation temperature requires that the glazing be tempered glass and that the insulation be able to withstand high temperatures. Alternative solar collectors and uses for solar energy are described in SOLAR ENERGY UTILIZATION FOR HEATING AND COOLING prepared under National Science Foundation Grant GI-39247, Research Applied to National Needs (RANN) Program, NSF 74-41.

DISCLOSURE OF INVENTION

The present invention provides a low-cost, practical, efficient, high-"wetted area" solar collector which is made from readily available materials, and uses that collector in a system to provide efficient and low-cost preheating of water for home use or for heating swimming pools.

The home preheater system includes a heat transfer liquid, which is commonly water, a solar collector, a preheater heat exchanger, which is commonly a converted gas hot water heat, and associated plumbing connecting the collector and heat exchanger in a closed loop for flow of the heat transfer liquid. The solar collector is designed to use readily available, inexpensive material. Expensive seals are nonessential, because the collector operates under a negative pressure.

The collector has at least one layer of insulation, which defines channels for the flow of the heat transfer liquid through the collector so that the liquid may absorb radiant energy from the sun. Above the layer of insulation, at least one layer of glazing is provided to define a ceiling for the liquid in the channels. A casing holds the layer of insulation and the glazing together, preferably with an adhesive which seals the edges of the layer of insulation at least along the edges of the layer. A pressure relief valve is incorporated into the plumbing of the preheater system to ensure that the solar collector operates at a negative pressure. As a means for maintaining the negative pressure within the solar collector, a jet pump, including an injector and an ejector nozzle, is used to draw the heat transfer liquid from the solar collector and to transfer it to a reservoir of the preheater heat exchanger. For low-temperature applications, one layer of glazing, such as regular glass, may be used, and a coating of radiation-absorbing material may be placed on the inside of the glazing. For moderate-temperature or high-temperature applications, multiple layers of glazing may be used, with the glazing spaced apart to reduce convection losses. Multiple layers of insulation may be used, and the layers may be separated by vapor barriers or other materials.

The preheater heat exchanger is generally a converted gas hot water heater which is used to exchange heat from the heat transfer liquid to water. Generally, it includes a pressurized storage tank for holding the potable water to be heated. A spray nozzle is adapted to spray the heat transfer liquid from the collector over at least a portion of the storage tank to create a liquid film on the storage tank, and to allow more efficient heat transfer between the heat transfer liquid and the water in the tank. A reservoir is included to collect the heat transfer liquid after the heat transfer has occurred. A pump circulates the heat transfer liquid from the reservoir to the spray nozzle and to the associated solar collector. Suitable plumbing connects the spray nozzle, reservoir, and pump to allow the desired circulation of heat transfer liquid in the exchanger. To ensure that the level of heat transfer liquid (which is ordinarily water) remains at a desired level, a float is placed within the reservoir and is connected to a one-way float valve. The float valve is connected to a conduit which joins the reservoir to the pressurized storage tank. The float is responsive to the level of heat transfer liquid in the reservoir so that the valve will open to allow water to flow into the reservoir when the level of liquid reaches a predetermined low level. Of course, other level sensors and flow means may be used to adjust the level of water in the reservoir.

Generally, the solar collector is positioned so that, upon an interruption in the circulation of the heat transfer liqud, the liquid in the collector will automatically drain from the collector. This positioning ensures that the solar collector will always function under a negative pressure, and allows the use of much less expensive materials, especially for the liquid seals.

A plurality of raised protrusions on the insulation in a regular array are used to support the glazing in the solar collector. The protrusions should have as small an area as possible in contact with the glazing to allow the maximum "wetted area" for the solar collector.

BRIEF DESCRIPTION OF THE DRAWINGS

FIG. 1 is a schematic isometric of a preferred preheater system.

FIG. 2 is a partial sectional detail of a low-temperature solar collector.

FIG. 3 is a partial sectional detail of a moderate-temperature solar collector.

FIG. 4 is a sectional view of a preferred preheater heat exchanger.

FIG. 5 is a partial sectional detail of an alternative solar collector.

BEST MODE FOR CARRYING OUT THE INVENTION

The present invention relates to a water preheater system which has two configurations. In one configuration, the heat transfer fluid is heated between about 20°–25° F. This type of heating is especially useful for heating water for swimming pool use. In a second configuration, the water is heated to about 75° F. for domestic applications, such as water preheating.

For purposes of this specification, the term "negative pressure" shall mean any pressure less than ambient pressure.

1. A Water Preheater System

As best seen in FIG. 1, a solar collector 10 is positioned above a preheater heat exchanger 12 so that a heat transfer liquid may flow into the solar collector 10, be heated by absorbing radiant energy, flow through associated plumbing lines 14 and 16 to a reservoir 18 of the preheater heat exchanger 12, and ultimately heat water within a pressurized storage tank 20 of the preheater heat exchanger 12. The heat transfer liquid may be pumped from the preheater heat exchanger 12 through a line 22 to an ejector 24, such as a jet pump. The ejector 24 maintains a negative pressure within the solar collector 10 by creating a suction with an injector 26 (FIG. 4) and a nozzle 28 (FIG. 4). Thus, heat transfer liquid is pulled through line 14 from the solar collector 10 and passes into the reservoir 18 of the preheater heat exchanger 12 through line 16. A portion of the liquid leaving the nozzle 28 passes through line 30 into the solar collector 10, where it diffuses through the collector 10. A pressure relief valve 32 is associated with the plumbing for the water preheater system and is set to maintain a pressure within the solar collector 10 at about 10 psia (−5 psig). That is, if the pressure relief valve 32 senses a pressure which is greater than 10 psia, the valve will open and will vent heat transfer liquid. In this way, the pressure relief valve 32 ensures that the solar collector always operates at a negative pressure. Therefore, expensive seals are not required.

The water preheater system is also designed so that upon a stoppage of the circulation of heat transfer liquid throughout the system, the liquid will automatically drain down from the solar collector to prevent damage to the collector.

2. Solar Collectors

As previously described, two separate configurations are provided for the water preheater system of this invention. In one configuration, low-temperature differential, low-pressure heating of water is provided, and this water is especially suited for swimming pool use. In a second configuration, medium-temperature, medium-pressure applications are used, and the water is useful for domestic hot water preheating.

a. Low-temperature applications

As best shown in FIG. 2, a low-temperature differential (about 20°–25° F.), low-pressure heating solar collector 10 includes a layer of insulation 34 which has channels 36 formed in its top surface. A heat transfer liquid 38, such as water, flows through the channels beneath a single layer of glass or polycarbonate glazing 40. The glazing 40 rests on a regular array of raised protrusions 42 of the insulation 34 to provide adequate support. Preferably, as small an area as possible is occupied by the protrusions 42 to allow the greatest "wetted area" for the heat transfer liquid 38 within the solar collector 10. The liquid 38 directly absorbs the radiant energy or has the maximum area for conduction heat transfer. Ordinarily, the protrusions extend approximately ⅛ inch above the low point of the channels 36. Channels 36 and protrusions 42 are easily fabricated into relatively high-density, closed-cell polystyrene foam or closed-cell Dytherm TM expandable copolymer available from ARCO. An aluminum casing 44 holds the insulation 34 and glazing 40 in place with an adhesive 46 along the edges of the insulation 34 and glass 40 in place, and seals the edges with an adhesive 46, such as silicon rubber sealer. Sponge rubber spacers 48 serve to cushion the glass from direct contact with the aluminum casing 44.

In some applications, the glazing 40 may be coated with a thin layer 50 of radiation-absorbing material, such as black paint, to enhance the absorptivity of the solar collector 10. As shown in FIG. 2, the coating 50 is preferably on the inner surface of the glazing 40 so that the coating 50 contacts the heat transfer liquid 38, thereby providing more efficient heat transfer between the coating 50 and the liquid 38. At temperature differentials of between about 20°–30° F., the heat losses from the solar collector to the atmosphere are small and the energy collector is quite efficient. If the pump fails (which would stop circulation of the heat transfer liquid 38), the radiation and convection losses would increase rapidly within the solar collector. This increase in heat losses would maintain the temperature within the collector at a low enough stagnation temperature that the polystyrene would not be damaged. Generally, it is expected that the maximum stagnation temperature within the solar collector 10 would be approximately 200° F.

A header 52 (FIG. 1) is fabricated into the insulation layer 34 to allow even distribution of the heat transfer liquid 38 throughout the solar collector 10. A similar collector channel (not shown) collects the heated water which passes out of the solar collector 10. Preferably, plastic fittings (not shown) are bonded to the entry and exit ports to complete the collector 10.

FIG. 5 shows an alternative collector wherein an aluminum casing 44a holds the polystyrene or Dytherm TM insulation and glazing 40 in place with a sealing layer 43 of aluminum or vinyl foil around the edge of the insulation 34. An adhesive 46 bonds the insulation 34 to the glazing 40 at the top and bonds the insulation 34 to a sealing sheet 45 of closed-cell polystyrene at the bottom.

In operation, radiant energy is transmitted through the glazing 40 and is absorbed by the coating 50. Since the coating 50 is in direct contact with the heat transfer liquid 38, the energy transfer between the coating 50 and the heat transfer liquid 38 is efficient. For use in heating swimming pool water, the heat transfer liquid 38 is, in fact, the swimming pool water, and upon passing through the solar collector 10, recycles to the swimming pool without passage through a preheater heat exchanger 12. That is, the pool acts as a reservoir 18 for the solar-heated water.

To circulate the water through the inexpensive solar collector 10 of this invention, a negative pressure or suction must be used. Due to the large area of the solar collector, a small positive pressure will generate sufficient force to damage the edge seal of the solar collector and will cause the heat transfer liquid to leak from the solar collector 10. A negative pressure, however, tends to reinforce the seal, and if any leakage occurs, the negative pressure ensures that air will leak into the solar collector 10.

b. Moderate-Temperature Applications

As best shown in FIG. 3, a solar collector 10 for use with moderate-temperature applications (a differential of about 75° F.) is shown. The solar collector 10 includes two layers of closed-cell foam insulation 34 separated by a vapor barrier 54, such as a thin sheet of polyethylene. The topmost layer of insulation 34 includes a regular array of upraised protrusions 42 extending from associated channels 36, as in the low-temperature solar collector just described. Three layers of glazing 40 are spaced above the top of the layers of insulation 34. The lowermost layer of glazing 40 rests atop the insulation 34 as in the low-temperature solar collector. The other layers of glazing 40 are spaced on suitable spacers 56 so that the multiple layers of glazing act to reduce convection heat losses for the collector. Preferably, three sheets of glass are used in a thermopane construction. Materials other than glass, such as polycarbonate, may be used, but they must have nearly the same transmission and emissivity characteristics as glass. Glass, however, is usually the most practical and economical material. The primary constraint for alternative glazing materials is that the glazing must be able to withstand the relatively high operating and stagnation temperatures experienced in the solar collector designed for moderate-temperature applications. Sponge rubber spacers 48 are also used to reduce the likelihood of fracture of the glazing layers 40. An aluminum casing 44 and an adhesive layer 46 are used to hold the layers of insulation 34 and glazing 40 in their appropriate spaced relationships. The heat transfer liquid 38, which is ordinarily dyed water, circulates above the topmost layer of insulation 34 in the channels 36 and is heated by the radiant energy of the sun.

Moderate-temperature applications, primarily for domestic water heating, require that the system operate at a temperature differential of approximately 75° F. above ambient. To preheat domestic water, the system uses a separate low-pressure solar loop and a preheater heat exchanger to transfer the heat from the heat transfer liquid to the pressururize domestic water system.

The additional glazing and insulation used in the moderate temperature application prevent radiation or convection heat loss to the atmosphere when operating at the higher temperature differentials. The additional glazing could, however, cause the stagnation temperature within the solar collector to exceed the limits of the insulative foam. Therefore, the layers of glass are uncoated and a dye is added to the heat transfer liquid. When the system is not operating, the heat transfer liquid will automatically drain downward from the solar collector to leave a highly reflective surface of the insulation exposed to the sun. Little energy will be absorbed, and the stagnation temperature will remain quite low. When the system is operating, the heat transfer liquid 38 directly absorbs the solar energy. The liquid transfers this heat in the preheater heat exchanger 12.

3. A Preheater Heat Exchanger

As best shown in FIG. 4, a preferred preheater heat exchanger 12 is a converted gas hot water heater. The liquid 38 from the solar collector 10 enters the preheater heat exchanger 12 through inlet conduit 16, and is stored in a reservoir 18 beneath a pressurized storage tank 20. A central cylindrical column 58 projects upwardly from the reservoir 18 and is surrounded by the pressurized storage tank 20. Heat (Q) is transferred from a thin film 60 on the inside of the column 58 through the wall of the storage tank 20 into water 62 stored within the storage tank 20. The storage tank 20 is designed so that convection heat transfer may occur within the stored domestic water 62. Water 62 enters near the bottom of the storage tank 20 through the downcomer spout of water inlet 64, and exits the storage tank 20 through outlet 66. Water leaving the preheater heat exchanger 12 usually enters a conventional water heater. A pressure sensor 68 is associated with the water outlet 66 to ensure that the domestic water is not contaminated by the heat transfer liquid 38, as will be explained.

In operation, heat transfer liquid 38 within the reservoir 18 enters a pump inlet 70 so that the pump 72 may force the liquid through line 74 to a spray nozzle 76 which deposits the liquid 38 in a thin film 60 upon the internal surface of the column 58. The liquid 38 flows downwardly along the column 58 and transfers heat (Q) from the liquid 38 to the water 62. At the end of the column 58, the liquid 38 drips into the reservoir 18.

Alternatively, the nozzle 76 may distribute the liquid 38 on the outside of the tank 20 to increase the heat transfer surface area. If a film 60 is formed on the outside of the tank 20, a sheath must be placed around the tank 20 to isolate the tank 20 from the insulation 86.

Preferably, a float 78 is positioned within the reservoir and is attached to a one-way float valve 80. The valve 80 controls a water inlet conduit 82 which connects the reservor 18 with the pressurized storage tank 20. The float 78 is responsive to the level of liquid 38 within the reservoir 18. If the level drops below a predetermined point, the valve 80 will open to allow water 62 to flow through the conduit 82 into the reservoir 18, thereby increasing the level of liquid within the reservoir 18. When the level reaches a predetermined high level, the one-way float valve 80 will automatically close to check the flow of water into the reservoir 18.

The pump 72 pumps a portion of the liquid 38 through line 22 to the injector 26 of the ejector 24. The injector 26 forces the liquid 38 into the converging portion of a nozzle 28 so that the liquid 38 will entrain other liquid in the ejector 24 and create a suction in the solar collector 10. The liquid exiting ejector 24 primarily flows back to the reservoir 18 through line 16, but a portion of the liquid enters the solar collector 10 through line 30. Thus, the ejector 24 serves to mix stored water from the reservoir 18 with newly heated water from the solar collector 10 and maintains a negative pressure within the solar collector 10.

If a leak develops in the column 58, water will flow from the pressurized storage tank 20 into the column 58 and will collect in the reservoir 18, and an overflow will eventually result or the pressure relief valve 32 will continually leak. Pressure sensor 68 will detect a drop in pressure in tank 20 if one occurs during repair of the leak. Preferably, the pressure sensor 68 is preset at approximately 10–20 psi, and when activated, will stop the pump 72. Thus, when the pressure in tank 20 drops, the pump 72 will automatically stop circulating the heat transfer liquid 38 so that the possibility of mixing of potable water 62 with heat transfer liquid 38 is eliminated. The pressure relief valve 32 of the system will vent the excess liquid from the system.

As shown in FIG. 4, the preheater heat exchanger 12 includes an outside casing 84 and insulation 86, such as commonly used with a water heater. In fact, it is preferred that the preheater heat exchanger 12 be a converted gas hot water heater.

The pump 72 is positioned below the reservoir 18 so that heat generated by the pump 72 is transferred to the water 62.

These and other embodiments of the invention will be known to those skilled in the art. The claims should be read to include those modifications, which do not depart from the inventive concept shown and described.

I claim:

1. A water preheating system using solar energy, comprising:
   (a) a heat transfer liquid;
   (b) a negative-pressure solar collector in which the liquid is heated;
   (c) a heat exchanger to exchange heat between the liquid and water; and
   (d) plumbing means connecting the collector and exchanger to create a closed loop for circulation of the liquid within the plumbing means, collector, and exchanger, and including means for maintaining a negative pressure in the collector, the means for maintaining the pressure including an injector positioned near a mouth of a nozzle in a return line from the collector so that the liquid exiting the injector and entering the nozzle draws additional liquid in the return line from the collector through the nozzle and a pump in a supply line between the heat exchanger and the injector to force liquid from the heat exchanger through the injector.

2. The system of claim 1 wherein the collector includes:
   (a) a foam insulation base having channels for flow of the liquid so that the liquid may absorb radiant energy; and
   (b) glazing above the base to define a ceiling for the channels.

3. The system of claim 2 wherein the glazing is at least one sheet of glass which has a coating of a radiation-absorbing material on a surface which contacts the liquid.

4. The system of claim 3 wherein the base includes a plurality of raised protrusions to support the glazing and to define the channels for flow of the liquid.

5. The system of claim 4 wherein the protrusions are a regular array of spaced dots protruding from the base.

6. The system of claim 2 wherein the glazing includes multiple spaced layers of glass, wherein the liquid is dyed to enhance its absorptivity, wherein the base includes a highly reflective surface in contact with the liquid, and wherein the collector is positioned so that liquid in the collector will automatically drain from the collector if there is a circulation malfunction.

7. The system of claim 2 wherein the collector further includes an aluminum casing to hold the base and an adhesive to adhere the base to the casing at least along the edges of the base.

8. The system of claim 2 wherein the collector further includes a sealing sheet below the base and an aluminum casing to hold the glazing, base, and sheet.

9. The system of claim 2 wherein the base includes two layers of insulating foam, the top layer having the channels.

10. The system of claim 9 wherein the base further includes a sealing layer disposed between the layers of insulating foam.

11. The system of claim 1, further comprising a pressure relief valve to interrupt circulation of the liquid to the collector if the pressure exceeds a predetermined value.

12. The system of claim 11 wherein the pressure relief valve is in the return line between the collector and the nozzle, the valve being set at about 10 psia (−5 psig).

13. The system of claim 1 wherein the fluid exiting the injector defines a direction along which the nozzle is positioned, so that the injector and nozzle are coaxial.

14. A water preheating system using solar energy, comprising:
   (a) a heat transfer liquid;
   (b) a negative-pressure solar collector in which the liquid is heated, including
      (i) at least one layer of insulation having channels for flow of the liquid so that the liquid may absorb radiant energy;
      (ii) at least one layer of glazing above the channels to define a ceiling for the liquid in the channels;
      (iii) a casing to hold the layer and glazing; and
      (iv) an adhesive to form a fluid seal between the layer and casing for the collector;
   (c) a heat exchanger to exchange heat between the liquid and water; and
   (d) plumbing means connecting the collector and exchanger to create a closed loop for circulation of the liquid within the plumbing means, collector, and heat exchanger, including
      (i) means for maintaining a negative pressure in the collector; and
      (ii) a pressure relief valve to interrupt circulation of the liquid to the collector if the pressure exceeds a predetermined value, wherein the means for maintaining a negative pressure includes an injector positioned near a mouth of a nozzle in a return line from the collector so that liquid exiting the injector and entering the nozzle draws additional liquid in the return line from the collector through the nozzle and a pump to force liquid through the injector.

15. The system of claim 14 wherein the heat exchanger includes a pressurized storage tank for holding the water.

16. The system of claim 15 wherein the heat exchanger further includes a spray nozzle adapted to spray the liquid over at least a portion of the tank to create a liquid film, thereby allowing more efficient heat transfer between the liquid and the water.

17. The system of claim 16 wherein the heat exchanger further includes a reservoir to collect the liquid after the liquid is sprayed onto the tank, wherein the pump also circulates the liquid from the reservoir to the spray nozzle and collector, and the plumbing means includes circulation lines between the spray nozzle, reservoir, and pump to allow the desired circulation.

18. The system of claim 17 wherein the pump is positioned so that heat losses caused by operating the pump are substantially absorbed by the water.

19. The system of claim 17 wherein the heat exchanger includes a level sensor responsive to the level of liquid in the reservoir and means for maintaining the level of liquid in the reservoir within a predetermined range, wherein the means is responsive to the level sensor.

20. The system of claim 17 wherein the collector is positioned so that, upon an interruption in the circulation of the liquid, the liquid in the collector will automatically drain from the collector.

21. A water preheating system using solar energy, comprising:
   (a) a heat transfer liquid;
   (b) a negative-pressure solar collector in which the liquid is heated, including
      (i) at least one layer of insulation having channels for flow of the liquid so that the liquid may absorb radiant energy;
      (ii) at least one layer of glazing above the channels to define a ceiling for the liquid in the channels;
      (iii) a casing to hold the layer and glazing; and
      (iv) an adhesive to form a fluid seal between the layer and casing for the collector;
   (c) a heat exchanger to exchange heat between the liquid and water, including a pressurized storage tank for holding the water, a spray nozzle adapted to spray the liquid over at least a portion of the tank to create a liquid film, thereby allowing more efficient heat transfer between the liquid and the water, a reservoir to collect the liquid after the liquid is sprayed onto the tank, a pump to circulate the liquid from the reservoir to the spray nozzle and collector, plumbing between the spray nozzle, a reservoir, and pump to allow the desired circulation, a float within the reservoir, a one-way float valve attached to the float, and a conduit connecting the valve to the tank so that the float is capable of maintaining the level of liquid in the reservoir within a predetermined range by drawing water into the reservoir when the level reaches a predetermined level; and
   (d) plumbing connecting the collector and exchanger to create a closed loop for circulation of the liquid, including
      (i) means for maintaining a negative pressure in the collector; and
      (ii) a pressure relief valve to interrupt circulation of the liquid to the collector if the pressure exceeds a predetermined value.

22. The system of claim 21 wherein the tank includes a water inlet and a water outlet, and wherein the water outlet includes a pressure sensor which will disengage the pump when the pressure within the tank drops below a predetermined level.

23. A water preheating system using solar energy to preheat water for medium-temperature, medium-pressure applications, comprising:
   (a) dyed water as a heat transfer liquid;
   (b) a negative-pressure solar collector in which the liquid is heated, including
      (i) at least one layer of foam insulation forming a base, the layer of foam including channels to allow the flow of the liquid atop the layer so that the liquid may absorb radiant energy when flowing through the collector;
      (ii) multiple layers of glazing positioned above the layers of foam to define a ceiling for the liquid and spaced apart to promote retention of heat in the liquid;
      (iii) a casing to hold the layers of foam and the glazing; and
      (iv) an adhesive to adhere the layer to the casing at least along the edges of the layer and to form a fluid seal between the layer and the casing;
   (c) a heat exchanger to exchange heat between the liquid and water, including
      (i) a pressurized storage tank for holding the water, wherein the tank allows convection heat transfer in the water;
      (ii) a spray nozzle adapted to spray the liquid over at least a portion of the tank to create a liquid film, thereby allowing more efficient heat transfer between the liquid and the water;
      (iii) a reservoir to collect the liquid after the liquid is sprayed onto the tank;
      (iv) a pump to circulate the liquid from the reservoir to the spray nozzle and to the collector; and
      (v) plumbing between the spray nozzle, reservoir, and pump to allow the desired circulation; and
   (d) plumbing connecting the collector and the reservoir of the exchanger to create a closed loop for circulation of the liquid and including means for maintaining a negative pressure in the collector.

24. The system of claim 23 wherein the means for maintaining a negative pressure in the collector include:
   (a) an injector positioned near the mouth of a nozzle so that liquid exiting the injector and entering the nozzle draws additional liquid in a return line from the collector through the nozzle; and
   (b) a pressure relief valve associated with the collector to interrupt circulation of the liquid to the collector if the pressure exceeds a predetermined value.

25. The system of claim 23 wherein the heat exchanger is a converted gas hot water heater.

26. The system of claim 23 wherein the heat exchanger further includes:
   (a) a float within the reservoir;
   (b) a one-way float valve attached to the float; and
   (c) a conduit connecting the valve to the pressurized storage tank;
wherein the float is responsive to the level of liquid in the reservoir so that the valve opens to allow water into the reservoir when the level of liquid reaches a predetermined level.

27. A heat exchanger especially adapted for use in preheating water for household use, comprising:
   (a) a pressurized storage tank including a water inlet and a water outlet, wherein the tank holds water to be heated and wherein the tank allows for convection heat transfer in the water;
   (b) a spray nozzle adapted to spray a heated liquid over at least a portion of the tank to create a liquid film, thereby allowing more efficient heat transfer between the liquid and the water;
   (c) a reservoir to collect the liquid after the liquid is sprayed onto the tank;
   (d) a pump to circulate the liquid from the reservoir to the spray nozzle;
   (e) means for heating the liquid in the reservoir;
   (f) plumbing between the spray nozzle, reservoir, and pump to allow the desired circulation;
   (g) a float within the reservoir;
   (h) a one-way float valve attached to the float; and
   (i) a conduit connecting the valve to the pressurized storage tank;
wherein the float is responsive to the level of liquid in the reservoir so that the valve opens to allow flow of water into the reservoir when the level of liquid reaches a predetermined level.

28. The heat exchanger of claim 27 wherein the tank and reservoir are made from a converted gas hot water heater.

29. The heat exchanger of claim 27 wherein the means for heating the liquid in the reservoir includes a solar energy collector to at least partially heat the liquid.

30. The heat exchanger of claim 27 wherein the portion of the tank on which the film is formed is an internal surface, the tank being annular and surrounding the surface.

31. A system for heating swimming pool water or the like with solar radiation, comprising:
(a) a negative-pressure solar collector in which the water is heated;
(b) a reservoir for the water; and
(c) plumbing means to connect the reservoir to the solar collector to create a closed loop for circulation of the water from the reservoir to the collector and back to the reservoir and including means for maintaining a negative pressure in the collector and means for circulating the water from the reservoir through the collector, wherein the means for maintaining a negative pressure includes an injector positioned near a mouth of a nozzle in a return line from the collector so that liquid exiting the injector and entering the nozzle draws additional liquid in the return line through the nozzle and a pump in a supply line between the reservoir and the injector to force liquid through the injector.

32. The system of claim 31 wherein the collector is positioned so that the water in the collector will automatically drain from the collector if there is a circulation malfunction.

33. A water preheating system using solar energy to preheat water for medium-temperature, medium-pressure applications, comprising:

(a) a heat transfer liquid;
(b) a negative-pressure solar collector in which the liquid is heated, including
(i) at least one layer of foam insulation forming a base, the layer of foam including channels to allow the flow of the liquid atop the layer so that the liquid may absorb radiant energy when flowing through the collector;
(ii) multiple layers of glazing positioned above the layers of foam to define a ceiling for the liquid and spaced apart to promote retention of heat in the liquid;
(iii) a casing to hold the layers of foam and the glazing; and
(iv) an adhesive to adhere the layer to the casing at least along the edges of the layer and to form a fluid seal between the layer and casing for the collector;
(c) a heat exchanger to exchange heat between the liquid and water, including
(i) a pressurized storage tank for holding the water, wherein the tank allows convection heat transfer in the water;
(ii) a spray nozzle adapted to spray the liquid over at least a portion of the tank to create a liquid film, thereby allowing more efficient heat transfer between the liquid and the water;
(iii) a reservoir to collect the liquid after the liquid is sprayed onto the tank;
(iv) a pump to circulate the liquid from the reservoir to the spray nozzle and to the collector; and
(v) plumbing between the spray nozzle, reservoir, and pump to allow the desired circulation; and
(d) plumbing connecting the collector and the reservoir of the exchanger to create a closed loop for circulation of the liquid and including means for maintaining a negative pressure in the collector.

* * * * *